United States Patent [19]

Besenfelder et al.

[11] 4,109,236
[45] Aug. 22, 1978

[54] APPARATUS FOR DIGITAL DATA RECOVERY FROM MASS STORAGE DEVICES

[75] Inventors: Edward Roald Besenfelder, Phoenix; Steve Garner Cantrell, Glendale; Charles Peter Cobeen, Phoenix, all of Ariz.

[73] Assignee: Honeywell Information Systems Inc., Phoenix, Ariz.

[21] Appl. No.: 807,711

[22] Filed: Jun. 17, 1977

[51] Int. Cl.² ............ G11C 29/00; G11B 27/00
[52] U.S. Cl. ............ 340/146.1 F; 235/312; 360/26
[58] Field of Search ............ 340/146.1 F, 146.1 AB; 235/312; 360/26, 27, 42, 53, 51

[56] References Cited

U.S. PATENT DOCUMENTS

| | | | |
|---|---|---|---|
| 3,702,996 | 11/1972 | Wolfer et al. | 360/27 |
| 3,729,708 | 4/1973 | Wolfer et al. | 340/146.1 F |
| 3,778,787 | 12/1973 | Cannon | 340/146.1 F |
| 3,831,192 | 8/1974 | Gross et al. | 360/26 |
| 3,838,447 | 9/1974 | Wray | 360/26 |
| 3,982,277 | 9/1976 | Naylor | 360/27 |
| 4,024,498 | 5/1977 | McIntosh | 340/146.1 F |
| 4,044,329 | 8/1977 | Besenfelder et al. | 340/146.1 F |

Primary Examiner—Charles E. Atkinson
Attorney, Agent, or Firm—Vincent B. Ingrassia; William W. Holloway, Jr.; Ronald T. Reiling

[57] ABSTRACT

A digital data recovery apparatus for extracting phase encoded data from mass storage devices is disclosed. By selective strobing of the data string at a frequency determined by the incoming data rate of data already read, a continuously updated data "window" is generated. The data synchronization, clock control and frequency averaging of the previously read data is accomplished without the use of any analog circuitry.

4 Claims, 7 Drawing Figures

APPARATUS FOR DIGITAL DATA RECOVERY FROM MASS STORAGE DEVICES

CROSS REFERENCES TO RELATED APPLICATIONS

1. Phased Locked Oscillator for Use with Variable Speed Data Source invented by Edward R. Besenfelder bearing Ser. No. 260,335 filed May 30, 1972, now issued as U.S. Pat. No. 3,731,220 and assigned to the same assignee as the instant invention.

2. Apparatus for Detecting Data Bits and Error Bits in Phase Encoded Data invented by Edward R. Besenfelder bearing Ser. No. 411,493, filed Oct. 31, 1973, now issued as U.S. Pat. No. 3,832,684 and assigned to the same assignee as the instant invention.

3. Programmable Data Envelope Detector invented by Edward R. Besenfelder and Steve G. Cantrell bearing Ser. No. 727,309 filed Sept. 27, 1976, now issued as U.S. Pat. No. 4,053,738 and assigned to the same assignee as the instant invention.

4. High Density Digital Recording invented by Ivors P. Breikss bearing Ser. No. 159,256, filed July 2, 1971, now issued as U.S. Pat. No. 3,736,581.

5. Adaptive Synchronizing Apparatus for Handling Phase Encoded Binary Information invented by Allan J. Wolfer and Edward Cooper bearing Ser. No. 192,861, filed Oct. 27, 1971, now issued as U.S. Pat. No. 3,702,996.

FIELD OF INVENTION

This invention relates generally to electronics circuitry used to retrieve digital data from mass storage devices. More specifically, the instant invention provides a means for reading phase coded data from magnetic mass storage devices that substantially cuts down on the read error rate, as well as eliminating the requirement that analog components for implementing the averaging techniques be utilized in the instant invention.

BACKGROUND OF THE INVENTION

Prior art apparatus used to retrieve data from mass storage devices utilized hybrid analog/digital circuitry to effectuate the proper timing of control signals to read and write phase encoded data from and to the storage medium. In order for the analog portion to compensate for tolerance in its circuit components, it is necessary that adjustable component elements (such as variable potentiometers and capacitors) be utilized. In addition to requiring that each unit be individually fine tuned for proper performance, which requires additional labor, the prior art devices were not adaptable to automated testing procedures because of the need for analog to digital (A/D) and digital to analog (D/A) converters. Even when D/A and A/D capabilities were available such testing did not usually point out the individual component problem but only pointed to the general analog portion of the device. The instant invention, requiring only digital components, is easily adapted to automatic testing procedures and therefore requires less labor for troubleshooting. As an illustration of the labor savings, it is noted that the phased locked oscillator of U.S. Pat. No. 3,731,220 requires four manual adjustments for each device, the oscillator appearing nine times for reading a nine track recording — a total of 36 individual adjustments for that device versus zero in the instant invention.

SUMMARY OF THE INVENTION

The digital data recovery apparatus of the instant invention is composed of a clock control circuit for providing a reference clock, a data synchronizer to coordinate the incoming data with a signal clock and synchronized to the reference clock, a window clock generator that is preset by the signal clock and toggled by the reference clock for providing a signal to the variable frame counter which allows a master counter to average the number of reference clocks between data bits over a variable number of data frames, i.e., by selective adjustment of the frame counter the master counter would not be reset until such time as the predetermined number of data frames had been counted. This in turn, would allow the decoder/latch attached to the master counter to select the average number of reference clocks between data bits over a larger time base. A window output selector driven by the decoder/latch is used to reset the window clock generator each time a data bit has been read. A window generator driven by the output of the frame counter, a preamble detector (such as that disclosed in U.S. Pat. No. 3,810,233 and pending application Ser. No. 727,309) and the reference clock provides the phase time and data time outputs required by a data and error detector, such as that described in U.S. Pat. No. 3,932,684. This data, as well as the data phase information, provided from the data synchronizer allows the detector to provide a strobe output, a data output, and an error output.

Because of the all digital design utilized in the data recovery apparatus, it is much more flexible than any of its hybrid predecessors and is easily adapted to firmware or software control should future developments so dictate. By controlling the initial conditions of the registers and counters the apparatus may cover a wide range of data rates and could therefore be easily adapted for use in the event that data structures or conditions are changed.

It is therefore an object of this invention to provide an all digital data recovery apparatus for retrieving data from mass storage devices.

It is a further object of this invention to reduce read and write errors from and to said mass storage devices caused by variations in the read/write frequency.

It is a still further object of this invention to provide for automatic testing of the digital data recovery apparatus and at the same time reduce the manual labor required to test the apparatus.

It is yet another object of this invention to provide means for easily altering data recovery apparatus so that it may be controlled from either a firmware or software source rather than a strictly hardware implementation.

DETAILED DESCRIPTION OF THE PREFERRED EMBODIMENT

Figure 1:
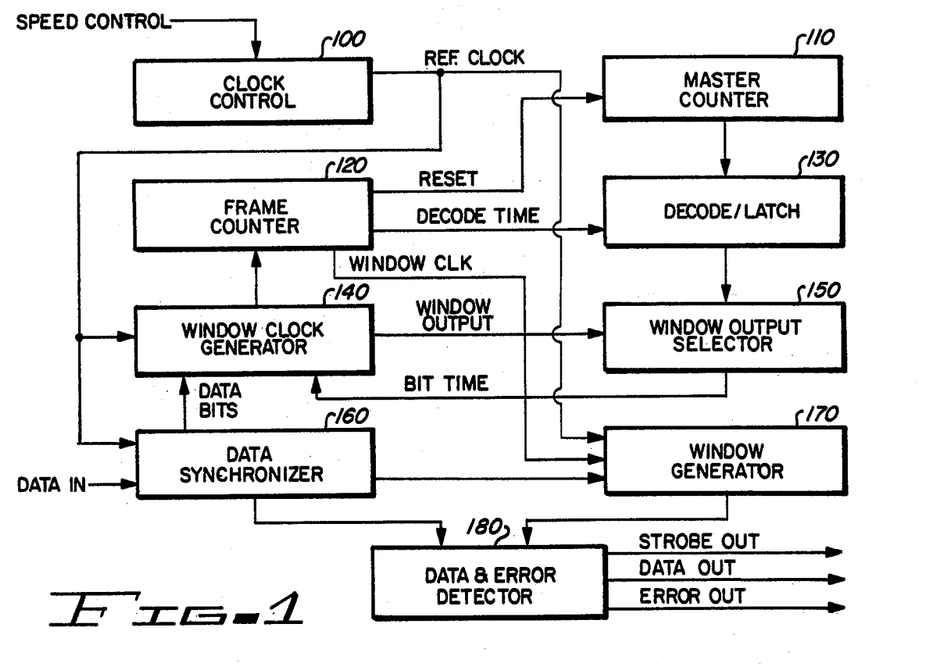
FIG. 1 is a block diagram of the instant invention showing its eight major portions and the associated data and error detector.

As illustrated in FIG. 1, the digital data recovery apparatus comprises a clock control 100, a master counter 110, a frame counter 120, a decoder/latch 130, a window clock generator 140, a window output selector 150, a data synchronizer 160, a window generator 170, and a data and error detector, 180. The data and error detector, although an integral part of the data digital data recovery apparatus is described and explained in detail in U.S. Pat. No. 3,832,684, issued Aug. 27, 1974 and assigned to the same assignee as the instant invention.

Figure 2:
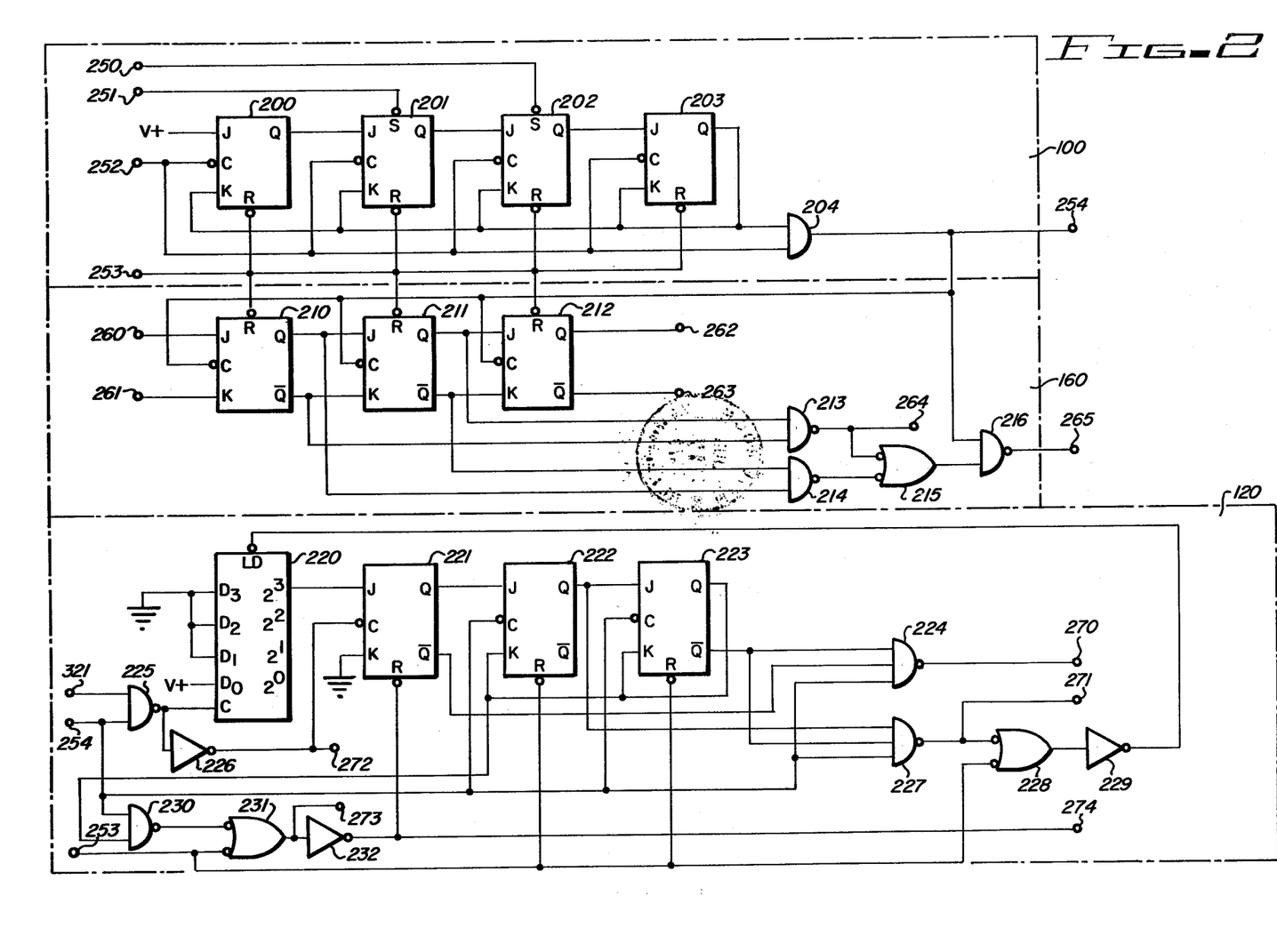
FIG. 2 is a schematic diagram of the clock control circuit, the data synchronizer and the frame counter.

The clock control, whose circuit schematic is shown in detail as block 100 of FIG. 2 is designed to provide a reference clock output 254. The reference clock 254 is a selective submultiple of the master clock 252 which is determined by the speed control signals 250 and 251. When the input at 251 is a "1" and the input at 250 is also a "1" (utilizing a positive logic notation) every fifth master clock pulse will be enabled to pass through AND gate 204 to the reference clock output 254. This particular combination is utilized whenever a 2.0273 megahertz reference clock signal is desired. With the speed control signal so defined and a 10.1376 megahertz master clock 252 flip-flops 200, 201, 202, and 203 act as a divide by five circuit to produce the desired reference clock frequency. This particular implementation is used when 75 inch per second tapes are being read. In a similar manner speed control inputs 250 and 251 provide a reference clock signal for 125 inch per second and 200 inch per second tapes when the speed control lines 250 and 251 are a logic "1" and "0" and a logic "0" "1" respectively. The clear signal 253 is used to initialize the condition of the divider flip-flop prior to the reading of each data record.

The schematic diagram of the data synchronizer 160 is also shown in FIG. 2. The data and its complement is input to flip-flop 210 at 260 and 261 respectively and shifted through flip-flops 211 and 212 on subsequent reference clock pulses. The data, now synchronized with the reference clock, is output at 262 and 263 to the data and error detector 180. Changes in the data inputs are detected by NAND gates 213 and 214. The inputs to gate 213, the output Q of flip-flop 211 and output Q of flip-flop 210 detect a data input transition from a logical "1" to a logical "0" causing its output 264 (data 2) to go from the logical "1" state to a logical "0" state for one reference clock period. NAND gate 241 detects a logical "0" to a logical "1" transition by having its input tied to the Q output of flip-flop 210 and the $\overline{Q}$ output of flip-flop 211, its output going from a logical "1" to a logical "0" for one reference clock period when a logical "1" to logical "0" data transition occurs at inputs 260 and 261. The output 214 is then OR'd with the output of NAND gate 213 at gate 215 which produces a high level output to NAND gate 216, whose duration is equal to one period of reference clock. The other input to NAND gate 216 is the reference clock itself, thereby allowing a signal clock output at 265 with a pulse width equal to that of the reference clock that occurs only when a data transition occurs at inputs 260 and 261.

The frame counter 120 to FIG. 2 controls the time base over which preceding data frames are to be averaged by controlling the clocking and resetting of the master counter 110. The time base to be utilized by the master counter is determined by the 4-bit up/down counter 220. By appropriately setting the initial load conditions the number of data frames to be averaged by the master counter may be varied. In the instant application, the frame counter is designed so that a total of eight data frames will be averaged by the master counter for its calculations of the incoming data rate. At the start of a data block the frame counter is cleared and the initial condition set by the initialize input 253. Subsequent operation of the frame counter is controlled by the signal clock +3 signal 321 and the reference clock 254. The signal clock +3 signal will be more fully explained in the detailed description of the window clock generator 140. On the simultaneous concurrence of both the signal clock +3 and reference clock pulses the output of NAND gate 225 clocks counter 220 and flip-flop 221. The frame counter, utilizing an eight frame base, is loaded with a binary "1" so that the Q output in flip-flop 21 does not provide a logic "1" output until the eighth signal clock +3 pulse has been generated. The window clock 272 is also generated at the simultaneous concurrence of signals 321 and 254 which provides a clock signal for the window generator 170, more of which will be described later. At the same time the reference clock 254, which is running at a much higher frequency than the signal clock +3 signal, clocks flip-flops 222 and 223 as well as acting as inputs to NAND gates 224 and 227 and 230. This process is utilized so that the load-reset output 271 is not propagated until two reference clocks after the eighth frame has been detected. This is necessary in order that race conditions caused by internal time delays in the T²L circuitry utilized to implement the instant invention can be overcome. The load-reset signal 271 which loads and resets the master counter also loads the frame counter. The Q output of flip-flop 223 is also an input to NAND gate 230 which, concurrent with reference clock 254, provides a reset signal 273 and a $\overline{\text{reset}}$ signal 274, which are used to clear and load the counters utilized in the master counter. The output of NAND gate 224 passes the reference clock to the count up output 270 utilized as the counter clock in the master counter. At the second reference clock after the eighth frame has been counted the $\overline{Q}$ output flip-flop 223 goes from the logic "1" to the logic "0" state, further inhibiting NAND gates 224 and 227 and preventing any further count up pulses 273 or the load reset pulse 271 from occurring for an additional reference clock period.

Figure 3:
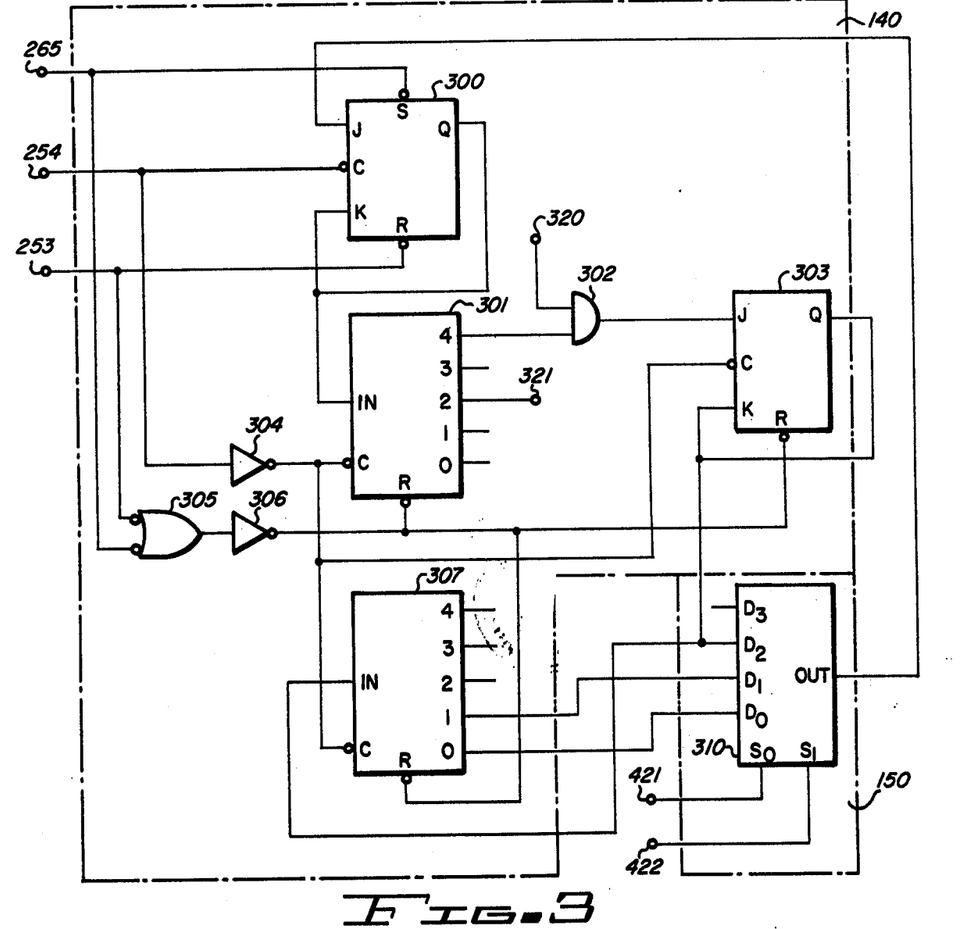
FIG. 3 is a schematic diagram of the window clock generator and the window output selector.

The window clock generator 140 of FIG. 3 comprises a multi-stage shift register configured in such a manner as to eliminate the race problems mentioned earlier. In effect flip-flop 300 and 303 and shift registers 307 and 301 form a 12-stage shift register that acts as a reference clock counter. The circuit is initialized by a pulse at 253 which clears registers 301 and 307 and sets flip-flops 300 and 303 to the "0" state. Prior to the first signal clock at 265, reference clock pulses at 254 have no effect on the circuit and it is not until a signal clock pulse is generated on 265 that the circuit becomes operational. A pulse 265 serves to set flip-flop 300 to the logic "1" state, while at the same time clearing shift registers 301 and 307 and resetting flip-flop 303 to the logic "0" state. After a signal clock pulse has been received, subsequent reference clock pulses at 254 will clock the "1" output flip-flop 300 through shift register 301. It is in this register that the signal clock +3 output 321 is generated, a logic "1" output at 321 indicating that a signal clock has been generated and three reference clocks have occurred since the signal clock. The signal clock +3 output is used as a check point to ensure that another data frame has not been read prior to that time. This is necessary since a second data frame within three reference clocks of a prior data frame is indicative of an error condition in the data channels. As is shown in FIG. 3, it is possible for any other combinations of reference clocks after a signal clock to be selected in the event that changes in the data specifications permit data changes within three reference clocks or if it becomes necessary that more than three reference clocks occur prior to the next data frame. Five reference clocks after the signal clock the logic "1" shifted from flip-flop 300 will be at the fifth bit output of shift register 301 which is an input to AND gate 302. This signal is then AND'ed with the preamble detected signal 320 to form the J input to flip-flop 303. The preamble detected signal 320 is an output from the preamble detector previously referenced which indicates that in the write mode at least 20 data transitions have passed since the beginning of the preamble and in the read mode that at least 60 data transitions have occurred. Assuming that the preamble detector is a logic "1" the sixth reference clock after a signal clock will cause a "1" at output Q of flip-flop 303 which is in turn used as an input to the window output selector 150 and to shift register 307. The seventh reference clock will cause the logic "1" originating in flip-flop 300 to appear at the low order bit output of shift register 307, the eighth reference clock will cause the "1" to appear at the second bit output of shift register 307, etc., the instant application allowing for the tracking of up to 11 reference clocks after a signal clock has been generated, however, as shown in FIG. 3, only those outputs representing the sixth, seventh, and eighth reference clocks after the signal clock is connected to the window output selector 150. The window output selector 150 selects either the Q output of flip-flop 303, the low order bit output of shift register 307, or the second bit output of shift register 307 depending upon the decode one and decode two inputs at 421 and 422 respectively. The window output selector 150 is in effect a one of four data selector whose output is determined by the state of decode one and decode two inputs generated by the decoder latch 130 of FIG. 4, more of which will be explained later. The output of the one-of-four selector 310 is connected to the J input of flip-flop 300 such that the next reference clock will change the Q output from a "0" to a "1" and reinsert a logic "1" into the shift register when the appropriate shift register output is selected by the decoding lines. The preamble detected signal 320, which along with the fifth bit of shift register of 301 is an input to AND gate 302, is a normally low level logic signal which is switched to the logic "1" state when the preamble detected signal from the preamble detector referenced supra becomes activated. The preamble detected signal will switch from a logic "1" to the logic "0" state at the end of the data record, i.e., when the postamble end is detected.

Figure 4:
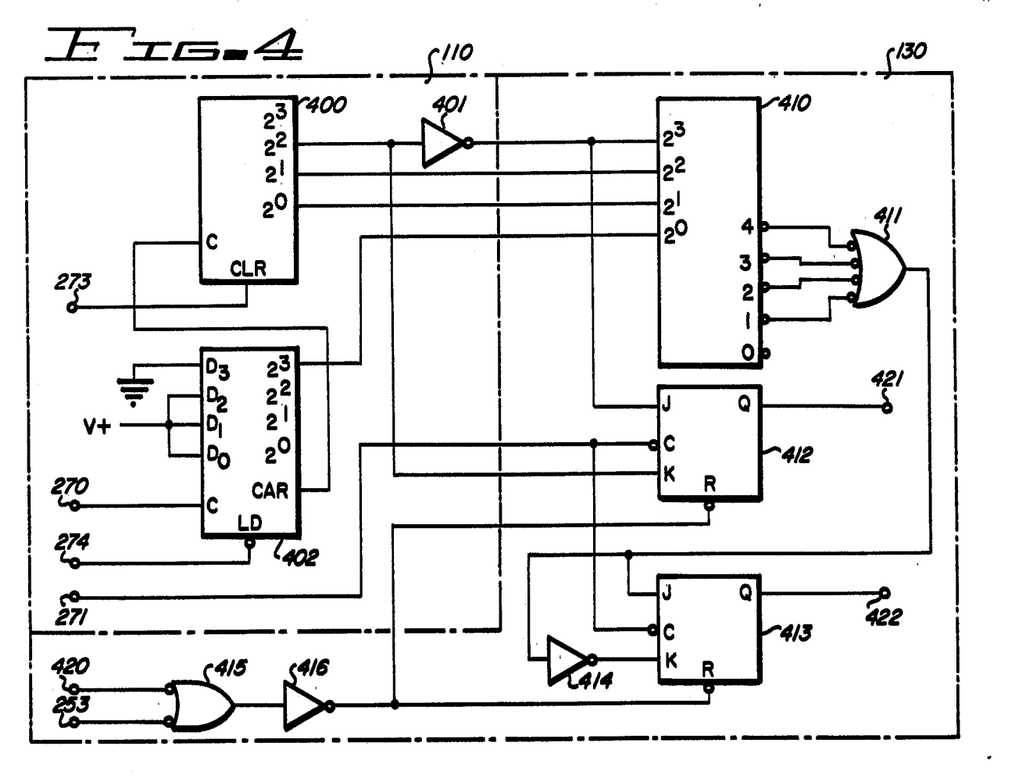
FIG. 4 is a schematic diagram of the master counter and decoder/latch.

The master counter is shown as block 110 of FIG. 4 and comprises counters 400 and 402 and inverter 401. The count up signal 270, generated by the frame counter 120 clocks the two stage-counter 400 and 402. The reset signal 273 was used to clear the upper stage of the counter 400, whereas the $\overline{reset}$ signal 274 is used to load a binary seven in the first stage of the counter 402. This is required because a total of three reference clocks are lost between the original reference clock following the signal clock and the starting of the master counter. The three reference clocks are lost in the three stages of flip-flops 221, 222, and 223 of the frame counter 120 acting as inhibit signals to NAND gate 224 and, thereby preventing any count up pulses 270 from being transmitted to the master clock for three reference clock pulses. The necessity of adding an additional four counts is described infra. With this implementation the $2^0$ output of counter 400 indicates the $2^4$ position of a number of reference clocks counted. In a like manner, the $2^1$ output represents the $2^5$ position, $2^2$ output represents the $2^6$ position, etc. The decoder/latch 130 of FIG. 4 decodes the outputs of the master counter in such a manner as to provide the latch portion of the decoder/latch with sufficient information that it may determine the average number of reference clocks generated over the previous eight data frames. In order to accomplish this result a binary to decimal converter 410, in conjunction with flip-flops 412 and 413, decodes the master counter output and latches the output of flip-flops 412 and 413 to provide a signal to the window output selector indicative of the average number of reference clocks per data frame over the prior eight frames. The decoder/latch works as follows:

The $2^2$ output of counter 400 is inverted and used as an input to the $2^3$ position of the binary number input of binary to decimal decoder 210, as well as the J input to flip-flop 412. In this manner, whenever a master counter has a count of 64 or greater (the $2^2$ output of counter 400 is a "1") the $2^3$ input of decoder 410 and the J inputs to flip-flop 412 will be a logical "0" forcing the decode one output 421 to the logical "0" state on the next load reset pulse. If the $2^3$ output of counter 400 is a logical "0" indicating that the count of 64 has not yet been reached, the input in the $2^3$ position of decoder 410 is a logical "1" as is the J input to 412, thereby forcing output 421 to the logical "1" state so long as the output of inverter 416 is not a logical "0". In this regard, gate 415 has as its inputs a write mode signal 420 and the initialize signal 253 which in normal operation will initialize the decoder outputs to the "0" "0" state and force the decoder output to the "0" "0" state in the write mode. A "0" "0" decoder output is desirable in the write mode because of the greater control exercisable. The initial setting of the output of the latch is also set to the "0" "0" state because in normal operation with no unusual variations in tape handler speed, etc., the count in the master counter with the output of inverter in the master counter should be between 64 and 71. Referring now to the output of the master counter with the output of inverter 401 a logical "1" the output of the decoder/latch, 421 and 422 will always be in the "1" "0" state. This is caused by the fact that a logic "1" is an input to the J input of flip-flop 412 and a logical "0" is the input to the K input of flip-flop 412. Also, since the $2^3$ position of the binary input number now represents a number greater than eight, the output of the OR gate 411 will never be a logical "1", and therefore, the J input to flip-flops 413 will be a logical "1" and the K input a logical "0" forcing the output at 422 to logic "0" state. For those cases when the output of the inverter 401 is a logic "0" so long as the $2^0$, $2^1$ and $2^2$ to the decoder 410 are logic "0's" the latch output will be in the "1" "0" state, at outputs 421 and 422 respectively, which represents that a number greater than 64 but less than 71 is in the master counter. When either the $2^0$, $2^1$, or $2^2$ inputs to decoder 410 is a logic "1" and the output of inverter of 401 is a logic "0", OR gate 411 will have a logical "1" output and force a logic "1" output at the decode 2 output 422. In this manner the following coding scheme can be realized a "0" "0" output at 421 and 422 respectively indicates a master counter count between 64 and 71, whereas a "1" "0" output represents a master counter count between 0 and 63 and "0" "1" output represent a master counter count greater than 72.

While the above decoding scheme has proved, in all respects, to be adequate for the purposes of recoverying data from mass storage devices, it is altogether possible that certain circumstances may arise when a different decoding scheme is desirable. In such a case it would be obvious to one skilled in the art to modify the above described arrangement so that a greater range of counts may be decoded.

Figure 5:
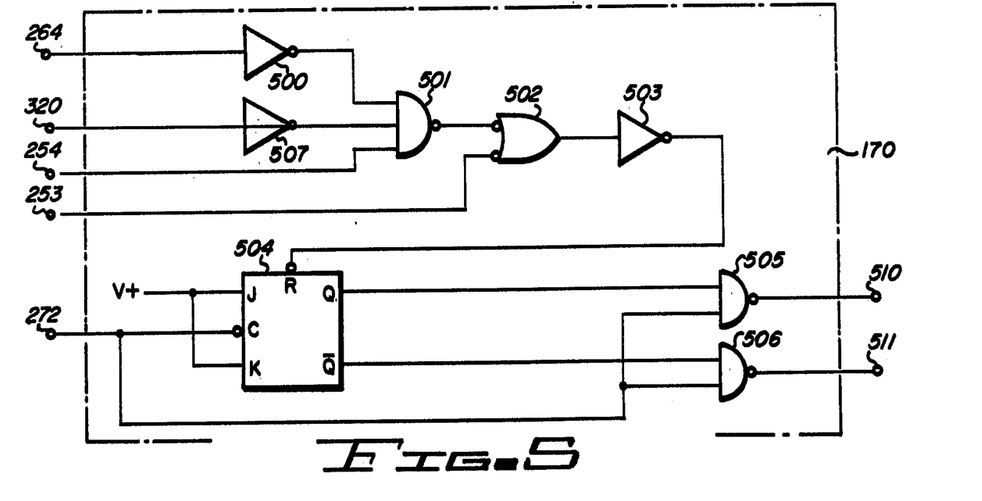
FIG. 5 is a schematic diagram of the window generator.

Block 170 of FIG. 5 is the window generator which provides information to the data and error detector 180 for determining whether or not a phase-bit or data-bit should appear during a particular period of time. The window generator operates as follows:

the data 2 input 264 from the data synchronizer 160 is an input to inverter 500, whose output then goes to NAND gate 501. The preamble detected signal 320 is an input to an inverter 507, whose output is also an input to NAND gate 501, and in conjunction with the reference clock 254 provides the enabling signals for the NAND gate. A logic "0" output of NAND gate 501 represents the occurrence of a data change from a logic "1" to a logic "0" plus two reference clocks and the absence of the preamble being detected. This output, along with the initialized signal 253, is fed into gate 502, whose output is inverted and connected to the reset line of flip-flop 504. In this manner, flip-flop 504 is reset every time an initialize pulse or the output of 501 goes to the logic "0" state. These gates are utilized to synchronize the flip-flop 504 with the incoming data. This is made possible because during the preamble all data is written as a "0" and all phase bits are therefore logic "1's". A logic "0" level at the data two input 264 represents the change from a phase bit to a data bit in the incoming data stream which should enable NAND gate 506, whose output is the data time 511, which will be a logic "1" pulse when the $\overline{Q}$ output of flip-flop 504 is in the logic "1" state and a window clock 272 occur simultaneously. Since the clock on flip-flop 504 is triggered by a logic "1" to a logic "0" transition, a window clock pulse passes through NAND gate 506 when it is enabled by the $\overline{Q}$ output of flip-flop 504 and on its falling edge toggles flip-flop 504 into the logic "1" state enabling the NAND gate 505 which will produce a pulse on the next window clock. Since the preamble consists of alternately written "1's" and "0's" and since the preamble detected signal does not go high until some 20 bits into the preamble, the phase time and data time output pulses should be synchronized with the incoming data and will thereafter provide information to the data and error detector 180 for the remainder of the data block.

Figure 6A:
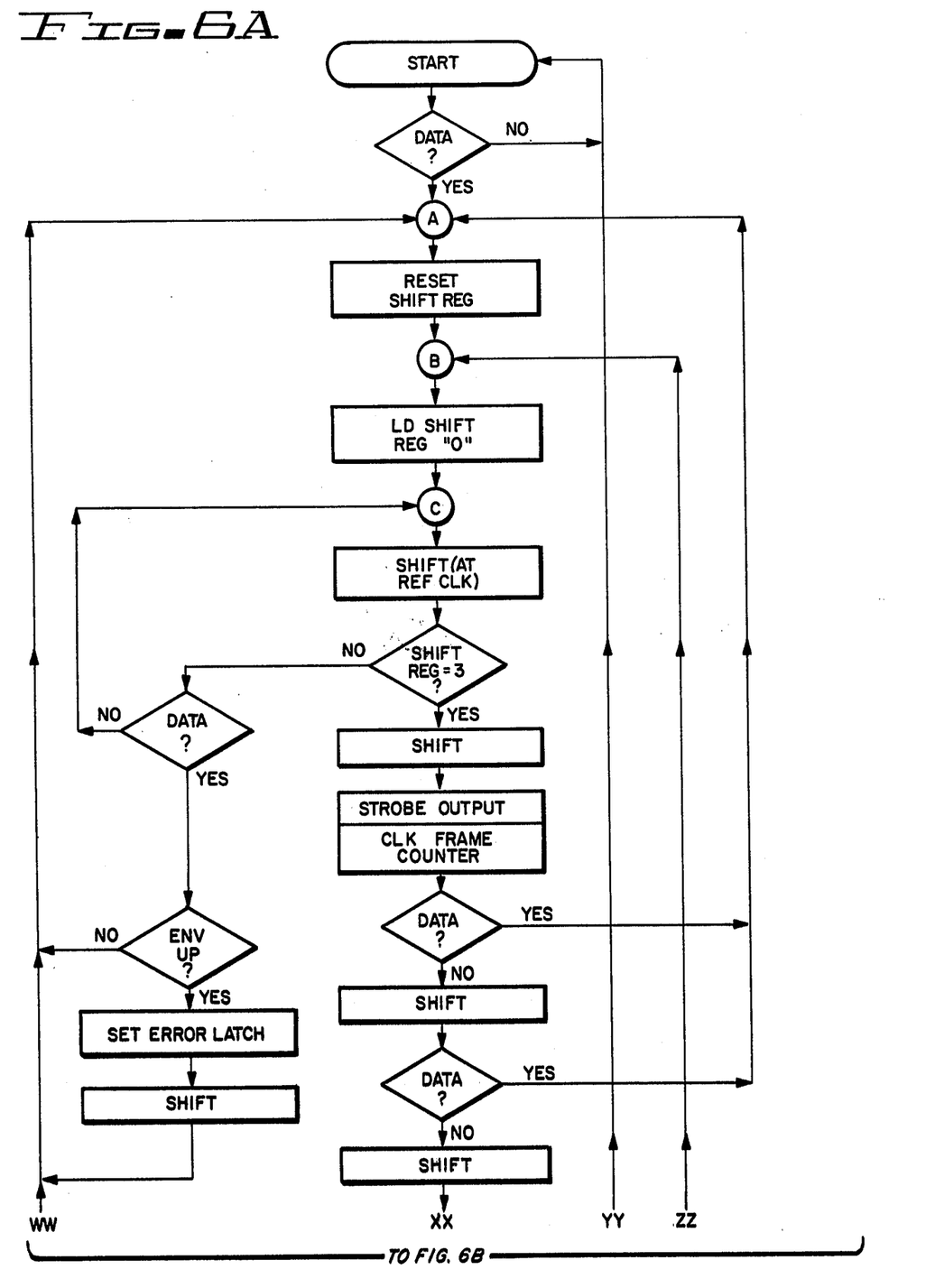
FIGS. 6A and 6B are the flow diagrams for the instant invention.
Figure 6B:
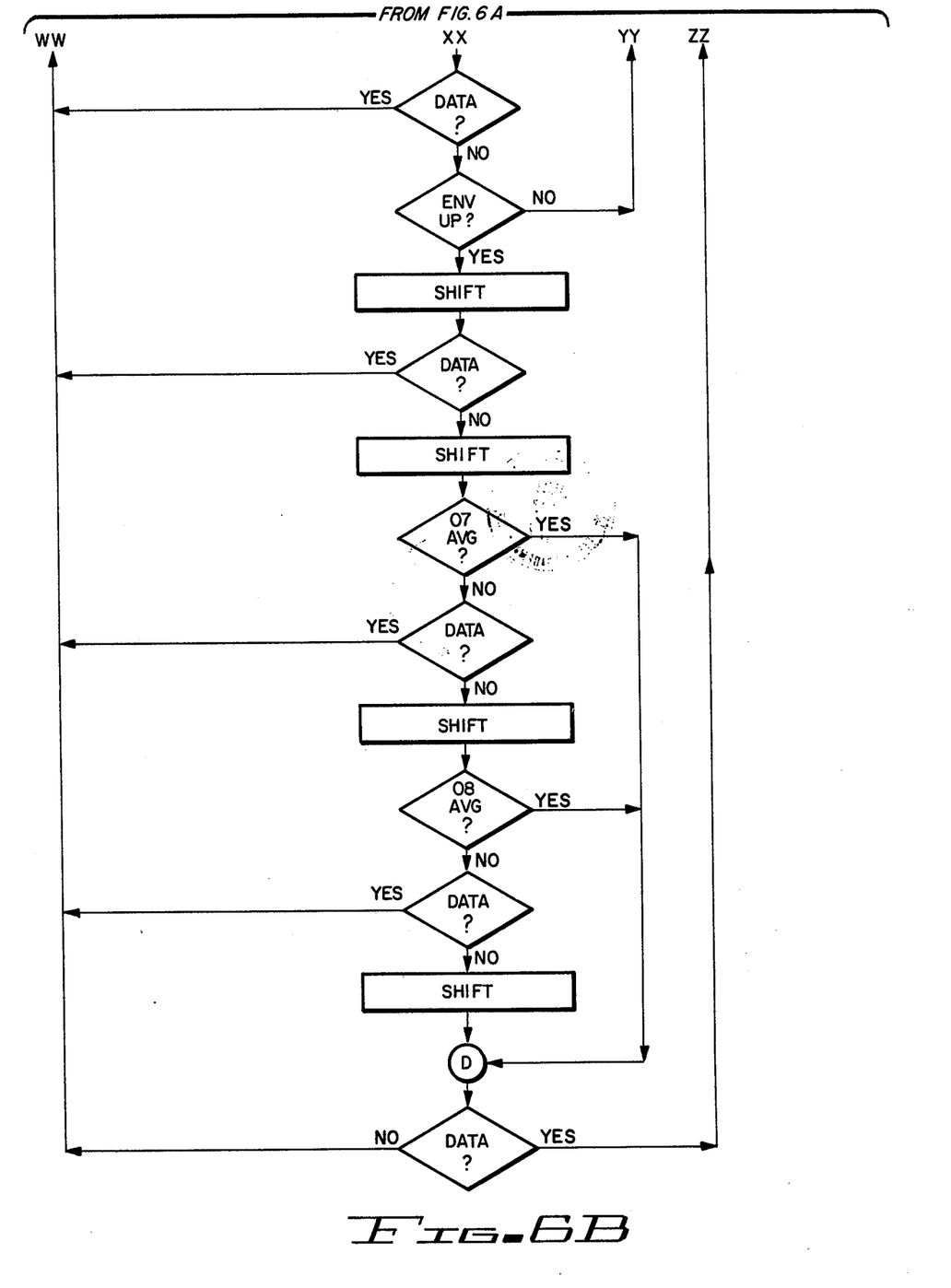

The flow diagram shown in FIG. 6a and 6b represents the informational flow in the digital data recovery apparatus, although it is to be noted that the error latch depicted in the lower left hand corner of FIG. 6a is in the data and error detector 180, whose operation is described in U.S. Pat. No. 3,832,684 issued Aug. 27, 1974.

Figure 7:
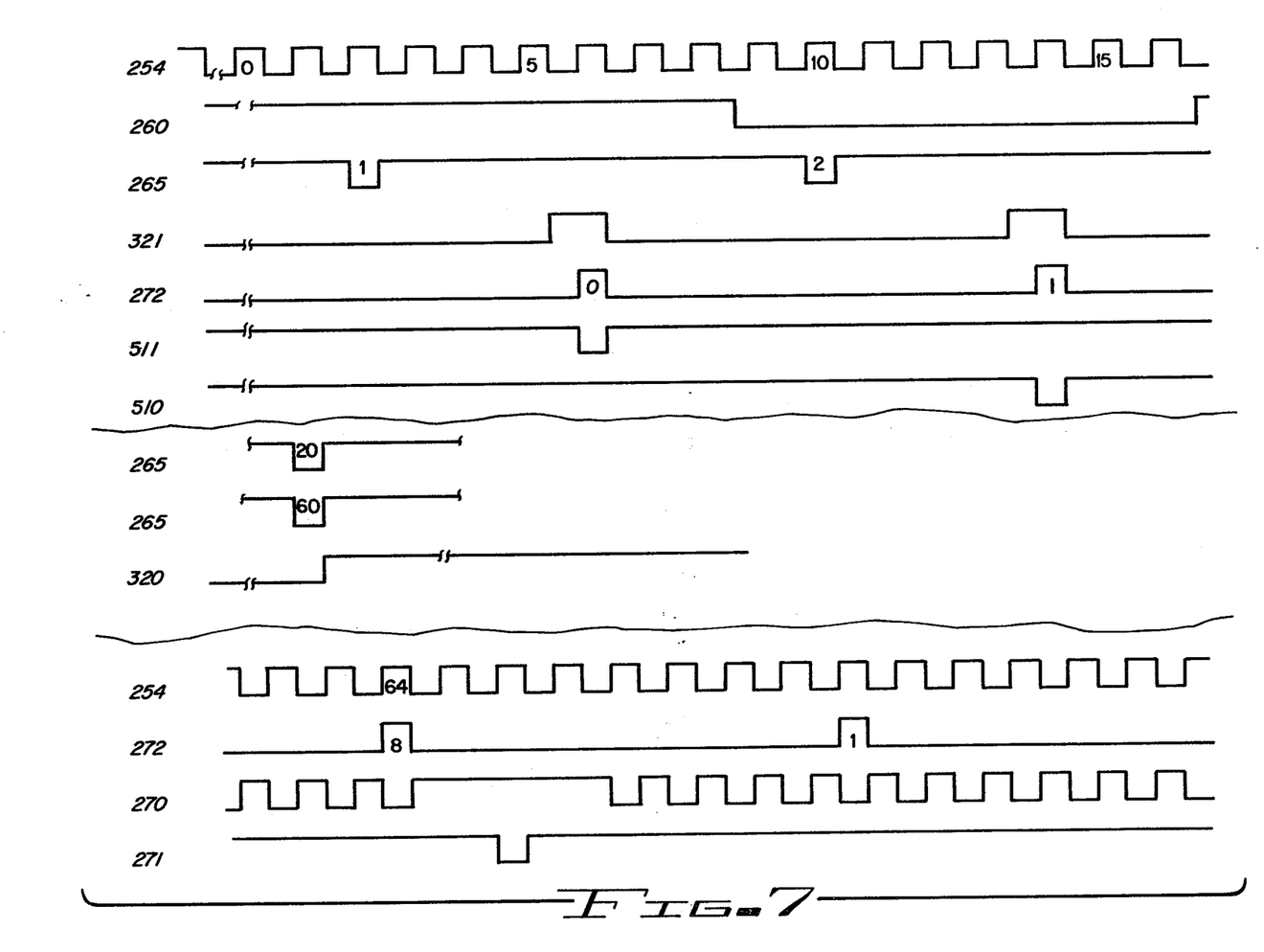
FIG. 7 is a timing diagram illustrating timing signals generated by the data recovery apparatus.

The timing diagram of FIG. 7 shows the relationship between selected signals generated by the digital data recovery apparatus. In the top portion of FIG. 7, the reference clock 254, the data input 260, the signal clock 265, the signal clock +3 321, the window clock 272, and the phase time output 510 and data time output 511 are depicted with the data recovery apparatus operating in the normal data recovery mode. In this case the data rate will be one-eighth the frequency of the reference clock. The signal clock is generated on the second reference clock after a data input transition and the signal clock +3 pulse three reference clocks after the signal clock. The window clock 272 taken in conjunction with either the phase time or data time outputs provide information on whether or not a phase bit or data bit is present at the input to the data recovery apparatus and allows the data error detector 180 to latch in the data bit provided that no phase errors have occurred.

The mid portion of FIG. 7 depicts the relative positioning of the preamble detected signal with the number of signal clocks generated in the read and write mode. As shown in FIG. 7, in the read mode the preamble detected signal goes to the logic "1" state after 20 successive data bits and phase bits of the preamble have been detected, whereas in the write mode, the preamble detected signal does not go to the logic "1" state until a total of 60 data bits and phase bits have been detected.

The bottom portion of FIG. 7 represents selected signal states occurring between data bits. As represented by the reference clock 254, in normal operation a total of 64 reference clocks will be generated for each eight frames that are counted, i.e., for each eight data transitions. The window clock 272, which strobes the frame counter, is shown to have generated its eighth pulse at the same time as the 63rd reference clock and as described supra a total of eight reference clocks are generated between the last window clock of one particular bit of data in the first window clock of the next bit of data. During this same time the load reset signal 271 is generated and the count up output 270 is inhibited for the first three reference clock pulses. One point that should be examined is that the master counter which is clocked by the count up output is loaded with a binary seven even though only three reference clocks are masked from its clock input in order to bring the master counter clock output into the middle range of each eight count block, i.e., since 64 reference clock pulses should occur during each eight data frames if the data recovery apparatus is operating at a nominal rate, in order to assure that the loss of one pulse will not cause a different decoder output, the addition of four pulses to the counter bring the counter output into the mid range, in this case for a decoder output signifying nominal data rate or a "0" "0" output at the decode 1 and decode 2 outputs respectfully. A master counter count of from 64 to 71 will provide that decoder output. The additional four is then added into the counter in order that this number will sit in the mid range (60 to 67 reference clock uses) and the lack of only one clock pulse will not shift the decoder output to a different average.

While the principles of the instant invention have now been made clear in an illustrative embodiment, there will be many modifications as to the structure arrangement, proportion, elements, material, and components that are obvious to those skilled in the art without departing from those principles. The appended claims are therefore intended to cover and embrace any such modifications within the limits of the true scope and spirit of the invention.

What is claimed is:

1. A digital data recovery apparatus for mass storage devices comprising:
 a programmable clock control circuit for providing a reference clock output;
 a data synchronizer connected to said clock control circuit and a data input signal for providing an output data signal synchronized with the reference clock, a data two output signal indicating a logic "1" to logic "0" transition of the data input, and a signal clock synchronized with the reference clock, one of said signal clocks being generated for each transition of the data input;
 a window clock generator connected to said clock control circuit and data synchronizer for providing a signal clock +3 signal and a plurality of output signals for determining the number of reference clocks that have occurred since the previous signal clock;
 a window output selector connected to the window clock generator for selecting a one of the plurality of output signals from said window clock generator;
 a frame counter connected to said window clock generator, said frame counter for providing a window clock output, a count up output, a load reset output, and a reset output and having programmable means for varying the number of signal clock +3 pulses necessary to generate the load-reset output signal;
 a master counter connected to said frame counter for accumulating the number of count up pulses generated during a preprogrammed number of data frames called for by the frame counter;
 a decoder/latch connected to said load reset output and to said master counter for providing a plurality of output signals to the window output selector, said output signals selecting a one of the output signals of the window clock generator;
 a window generator connected to said clock control circuit, said data synchronizer, and said frame counter for providing a phase time output and a data time output; and,
 a data and error detector responsive to the phase-time and data-time outputs from said window generator and the synchronized data from the data synchronizer for providing a data output and an error output.

2. The digital data recovery apparatus for mass storage devices as recited in claim 1, wherein the window clock generator further comprises:
 a plural bit serial shift register with both a clear and load capability with logic means selectively coupled thereto for inhibiting the operation of the serial shift register in the absence of a preamble detected signal.

3. A digital data recovery apparatus for mass storage devices as recited in claim 2, wherein the window output selector further comprises:
 a data selector connected to said plural bit serial shift register for selecting a one of said outputs depending upon the state of the output signal from the decoder/latch.

4. A digital data recovery apparatus for retrieving phase encoded data from a magnetic storage medium comprising:
 clock generated means for providing a reference clock;
 data synchronization means responsive to said reference clock for providing a synchronized data output;
 edge detection means connected to the data synchronization means for providing a signal clock;
 first logic means responsive to the reference clock and the signal clock for providing output signals representing the number of reference clocks occurring after the previous signal clock;
 second logic means responsive to said first logic means for determining the number of a selected one of said first logic means output signals that have occurred, and for providing output signals dependent thereon;
 third logic means responsive to the second logic means for providing signals to the first logic means for selecting a one of said first logic means output signals;
 fourth logic means responsive to the edge detection means and the second logic means for providing an output signals indicating that a phase bit or a data bit has been read; and data and error detection means responsive to the data synchronization means and the fourth logic means for providing a data output and an error output.

* * * * *